United States Patent [19]
Benzing, II et al.

[11] Patent Number: 6,109,322
[45] Date of Patent: *Aug. 29, 2000

[54] LAMINATE COMPOSITE STRUCTURE FOR MAKING AN UNVULCANIZED CARCASS FOR A RADIAL PLY TIRE AS AN INTERMEDIATE ARTICLE OF MANUFACTURE

[75] Inventors: James Alfred Benzing, II, Stow; Daniel Ray Downing, Uniontown; William James Head, Ravenna; Frederick Forbes Vannan, Clinton, all of Ohio

[73] Assignee: The Goodyear Tire & Rubber Company, Akron, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/947,611

[22] Filed: Oct. 9, 1997

Related U.S. Application Data

[63] Continuation-in-part of application No. 08/688,239, Jul. 29, 1996, abandoned, and application No. 08/573,341, Dec. 15, 1995.

[51] Int. Cl.$^7$ ........................................ B60C 9/02
[52] U.S. Cl. ..................... 152/548; 152/510; 152/543
[58] Field of Search ..................... 152/548, 555, 152/510, 526, 543, DIG. 12, DIG. 16, 450; 156/133, 134, 405.1, 406.4, 130.7, 123, 111, 116, 110.1, 130

[56] References Cited

U.S. PATENT DOCUMENTS

| | | |
|---|---|---|
| 1,320,121 | 10/1919 | Brucker . |
| 1,353,769 | 9/1920 | Macbeth et al. ............................ 83/56 |
| 1,353,934 | 9/1920 | Morris . |
| 1,393,164 | 10/1921 | Reinhardt et al. . |
| 1,502,120 | 7/1924 | Rasmussen . |
| 1,667,009 | 4/1928 | Matthias . |
| 1,730,307 | 10/1929 | Stevens . |
| 1,770,895 | 7/1930 | Abbott, Jr. . |
| 1,933,692 | 11/1933 | Abbott, Jr. .............................. 156/123 |
| 2,724,423 | 11/1955 | Harris . |
| 2,754,887 | 7/1956 | Wykoff . |
| 2,941,465 | 6/1960 | Zimmerli ................................. 100/155 |
| 3,027,289 | 3/1962 | Gitzinger ................................ 156/132 |
| 3,234,769 | 2/1966 | Bretschneider ......................... 72/238 |
| 3,237,673 | 3/1966 | Ward ..................................... 152/354 |
| 3,413,921 | 12/1968 | Boatman ................................ 101/248 |
| 3,504,710 | 4/1970 | Pancoast ................................ 138/170 |
| 3,509,929 | 5/1970 | Delobelle ............................... 152/354 |
| 3,591,439 | 7/1971 | Lebold et al. . |
| 3,803,965 | 4/1974 | Alderfer .................................. 83/155 |
| 4,083,738 | 4/1978 | Kahaner .................................. 156/92 |
| 4,210,042 | 7/1980 | Felten ...................................... 83/56 |

(List continued on next page.)

FOREIGN PATENT DOCUMENTS

| | | |
|---|---|---|
| 246497 | 11/1987 | European Pat. Off. . |
| 737564 | 12/1995 | European Pat. Off. . |
| 701887 | 3/1996 | European Pat. Off. . |
| 3444612 | 12/1986 | Germany . |
| 3724784 | 2/1989 | Germany . |
| 59-195406 | 11/1984 | Japan . |
| 5-221204 | 8/1993 | Japan . |
| 41755 | 7/1962 | Luxembourg . |
| 580838 | 9/1946 | United Kingdom . |

*Primary Examiner*—Geoffrey L. Knable
*Attorney, Agent, or Firm*—David L King

[57] ABSTRACT

A laminate composite structure is provided in continuous lengths or rolls for making an unvulcanized carcass for a radial ply pneumatic tire as an intermediate article of manufacture. The laminate has a ply and a plurality of elastomeric components hot formed and attached directly to the ply. Each component has a predetermined cross-sectional profile. The elastomeric components including, but not limited to, a liner, a sidewall, and a chafer. Additional other elastomeric components for the carcass can be formed and attached to the laminate structure. The laminate forms an intermediate article of manufacture that at a later stage of tire building can be cut to length and spliced along common ends to form a cylindrical carcass structure.

5 Claims, 18 Drawing Sheets

U.S. PATENT DOCUMENTS

| | | | |
|---|---|---|---|
| 4,232,723 | 11/1980 | Gazuit | 52/350 |
| 4,334,448 | 6/1982 | Messerschmitt | 83/171 |
| 4,368,633 | 1/1983 | Nogota | 72/239 |
| 4,393,450 | 7/1983 | Jerard | 83/651.1 |
| 4,465,536 | 8/1984 | Makino et al. | 156/133 |
| 4,466,473 | 8/1984 | Matyja et al. | 152/354 |
| 4,552,007 | 11/1985 | Mantovan | 72/239 |
| 4,653,304 | 3/1987 | Feldmann et al. | 72/239 |
| 4,685,390 | 8/1987 | Pav et al. | 100/168 |
| 4,733,709 | 3/1988 | Lambillotte et al. | 152/548 |
| 4,768,575 | 9/1988 | Brunner et al. | 152/552 |
| 4,810,317 | 3/1989 | Lang | 156/134 |
| 4,813,319 | 3/1989 | Weyand, Jr. | 83/56 |
| 4,857,123 | 8/1989 | Still et al. | 83/56 |
| 4,877,468 | 10/1989 | Siegenthaler | 156/111 |
| 4,905,493 | 3/1990 | Benedetti | 72/225 |
| 4,946,525 | 8/1990 | Aupic et al. | 156/134 |
| 4,965,733 | 10/1990 | Kimura et al. | 83/581 |
| 5,029,502 | 7/1991 | Irie | 83/56 |
| 5,030,079 | 7/1991 | Benzing, II | 425/140 |
| 5,059,274 | 10/1991 | Kumagai | 156/406.4 |
| 5,062,462 | 11/1991 | Rye et al. | 154/548 |
| 5,196,077 | 3/1993 | Kaga | 152/543 |
| 5,273,601 | 12/1993 | Sergel et al. | 156/133 |
| 5,327,353 | 7/1994 | Nagano | 364/474 |
| 5,327,807 | 7/1994 | Chang | 83/783 |
| 5,328,532 | 7/1994 | Azuma et al. | 156/134 |
| 5,435,370 | 7/1995 | Ahmad et al. | 152/543 |
| 5,638,732 | 6/1997 | Becker et al. | 83/461 |

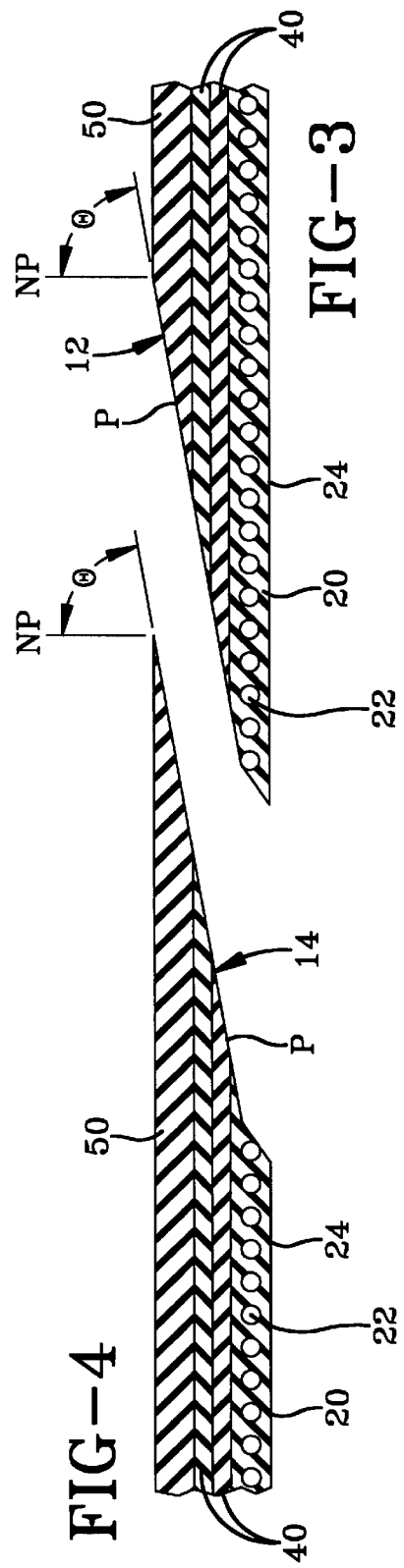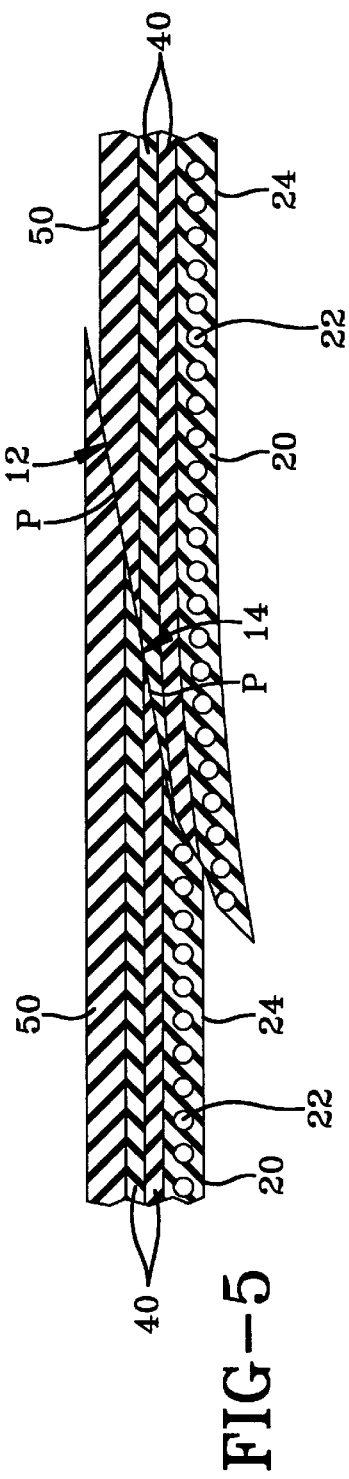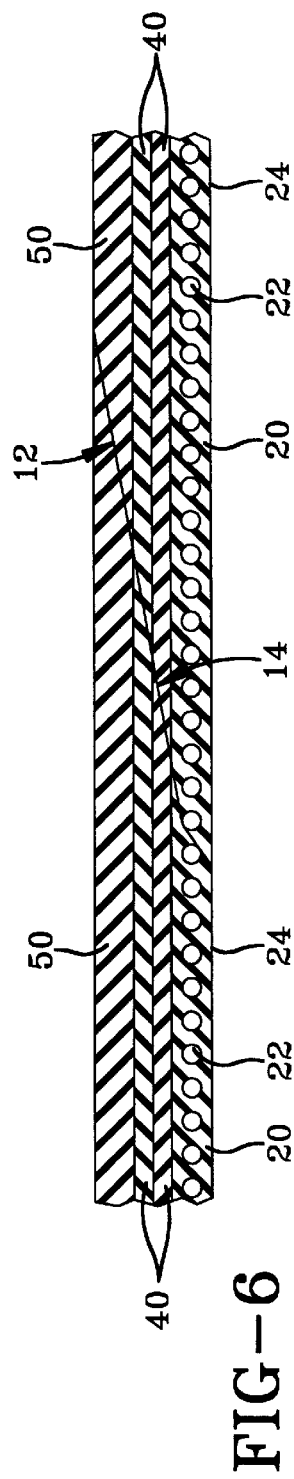

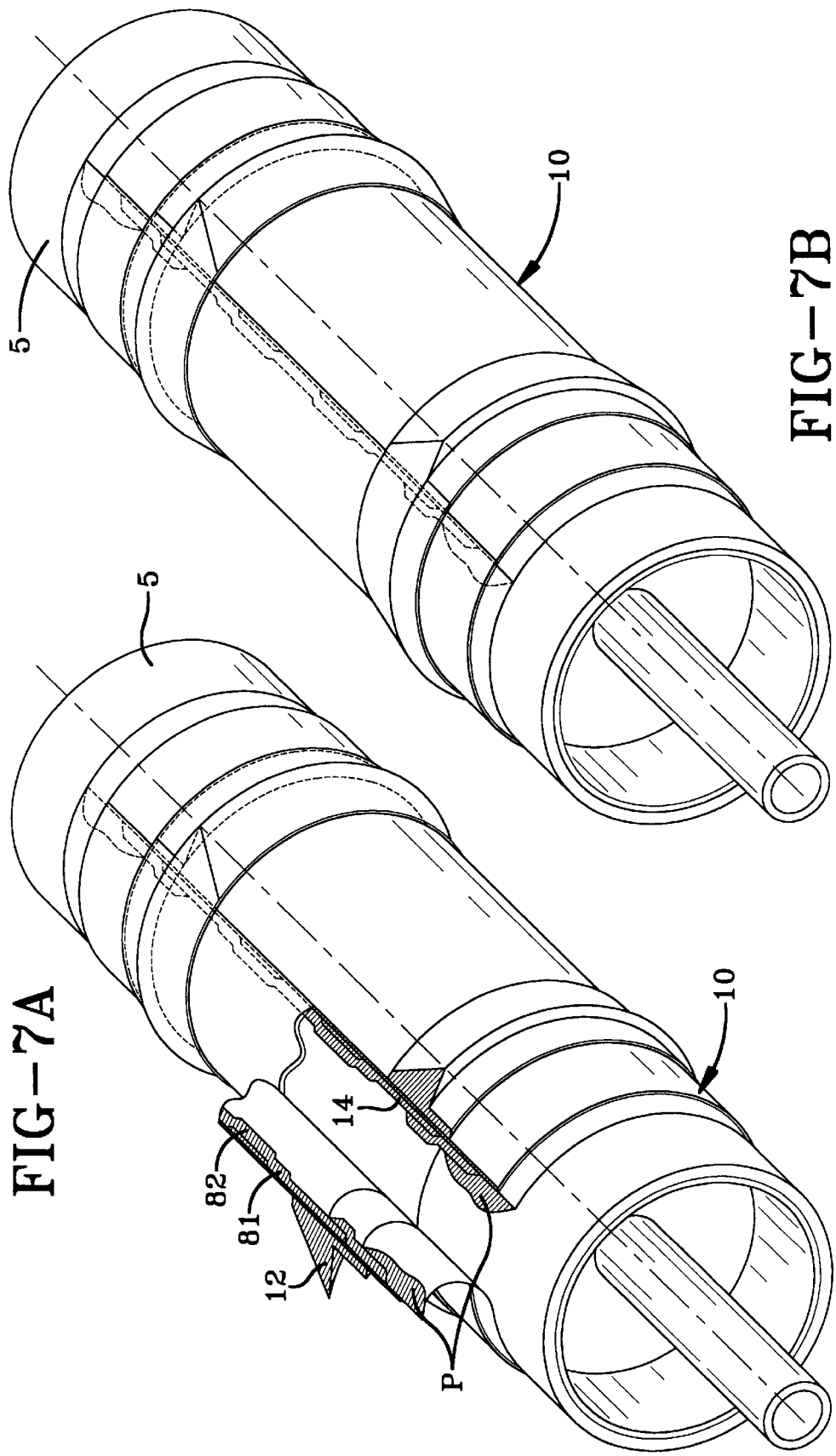

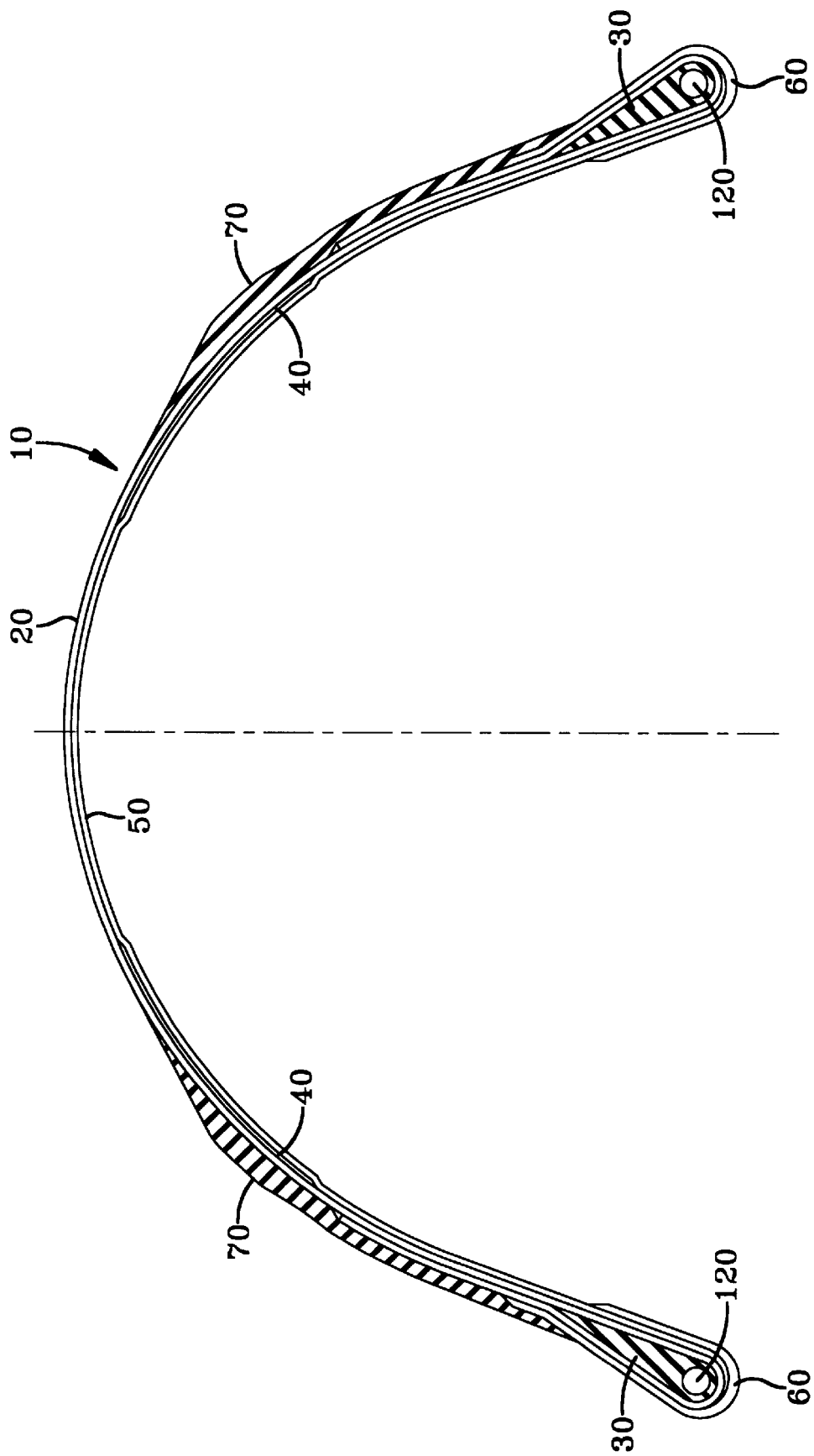

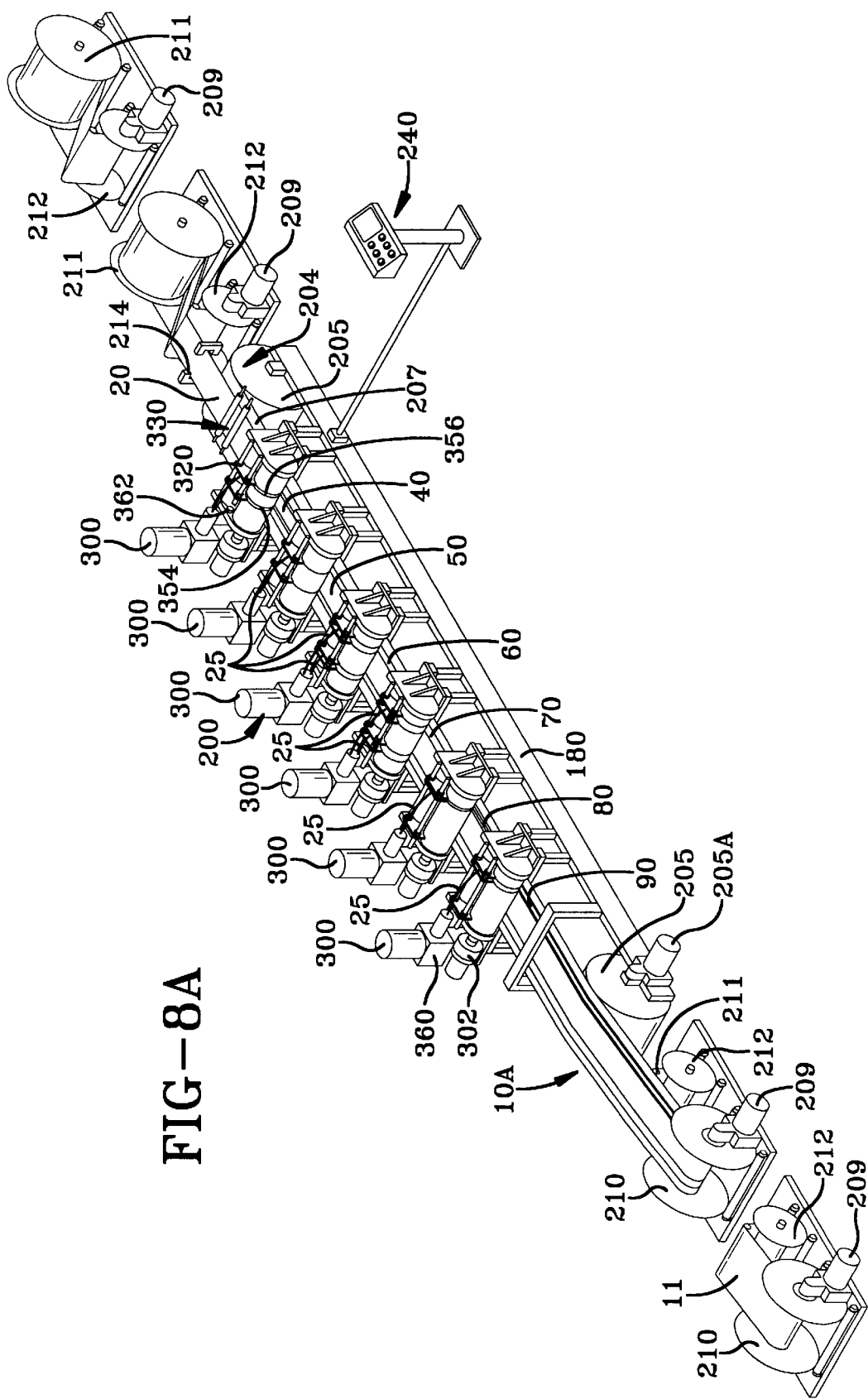

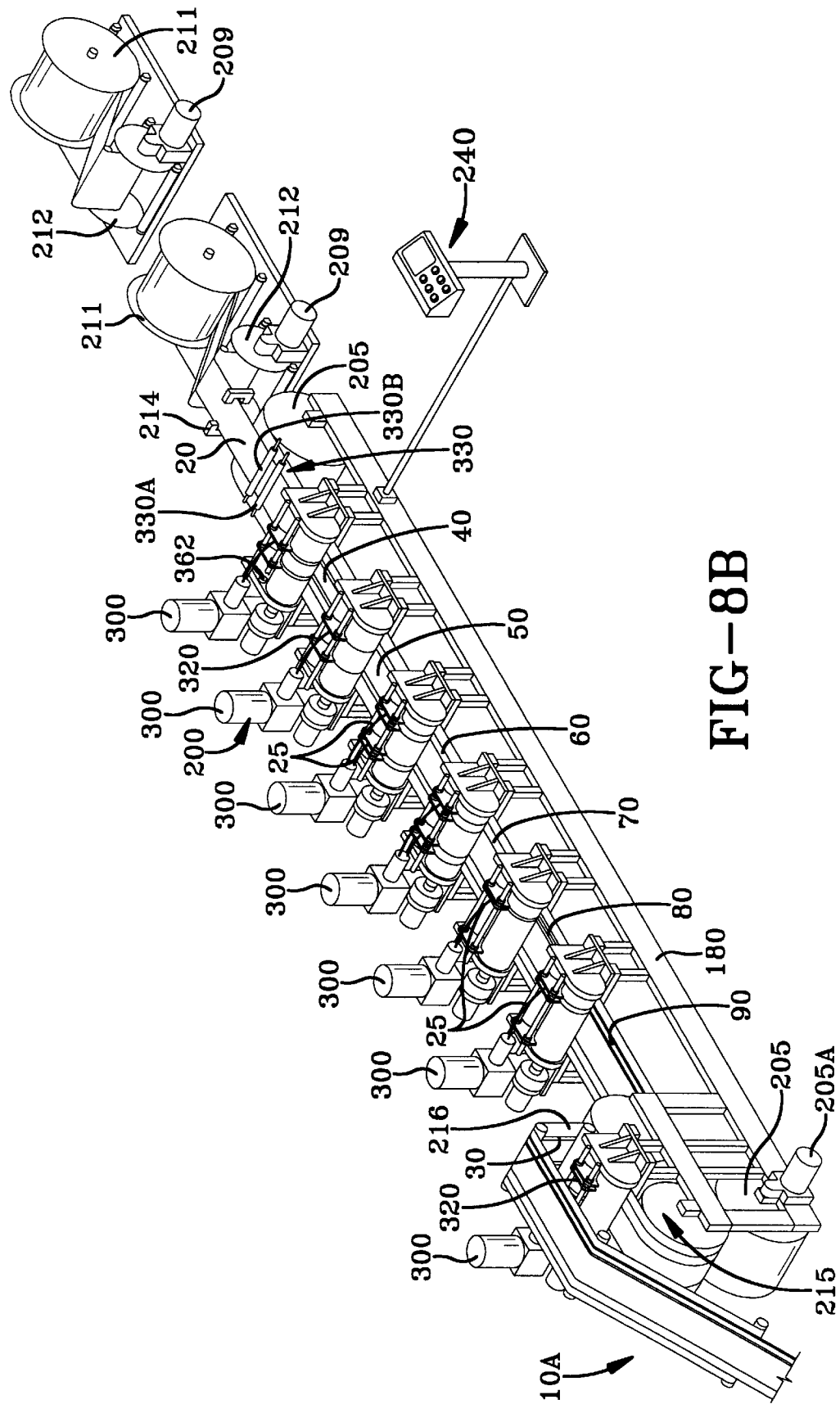

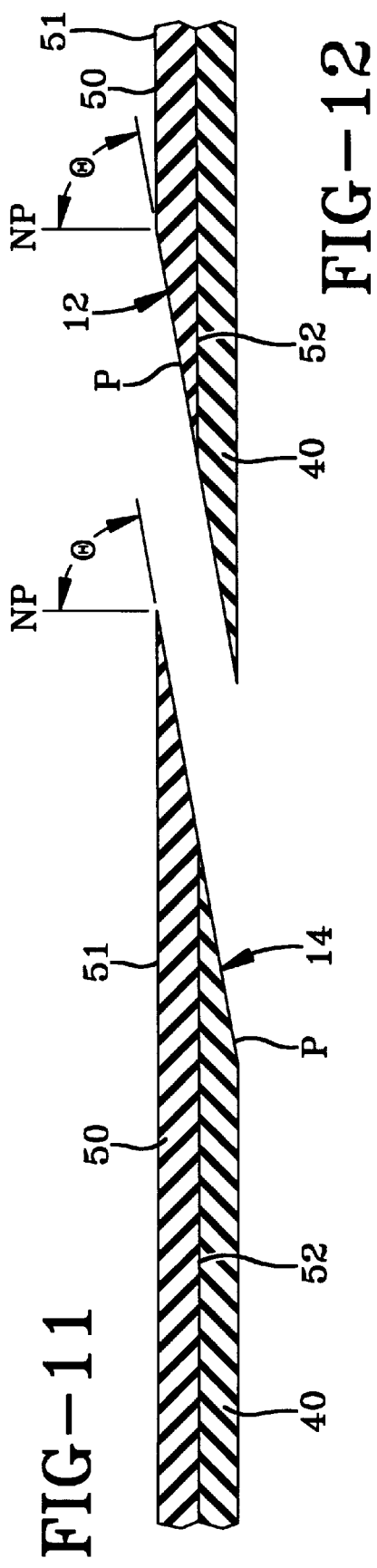

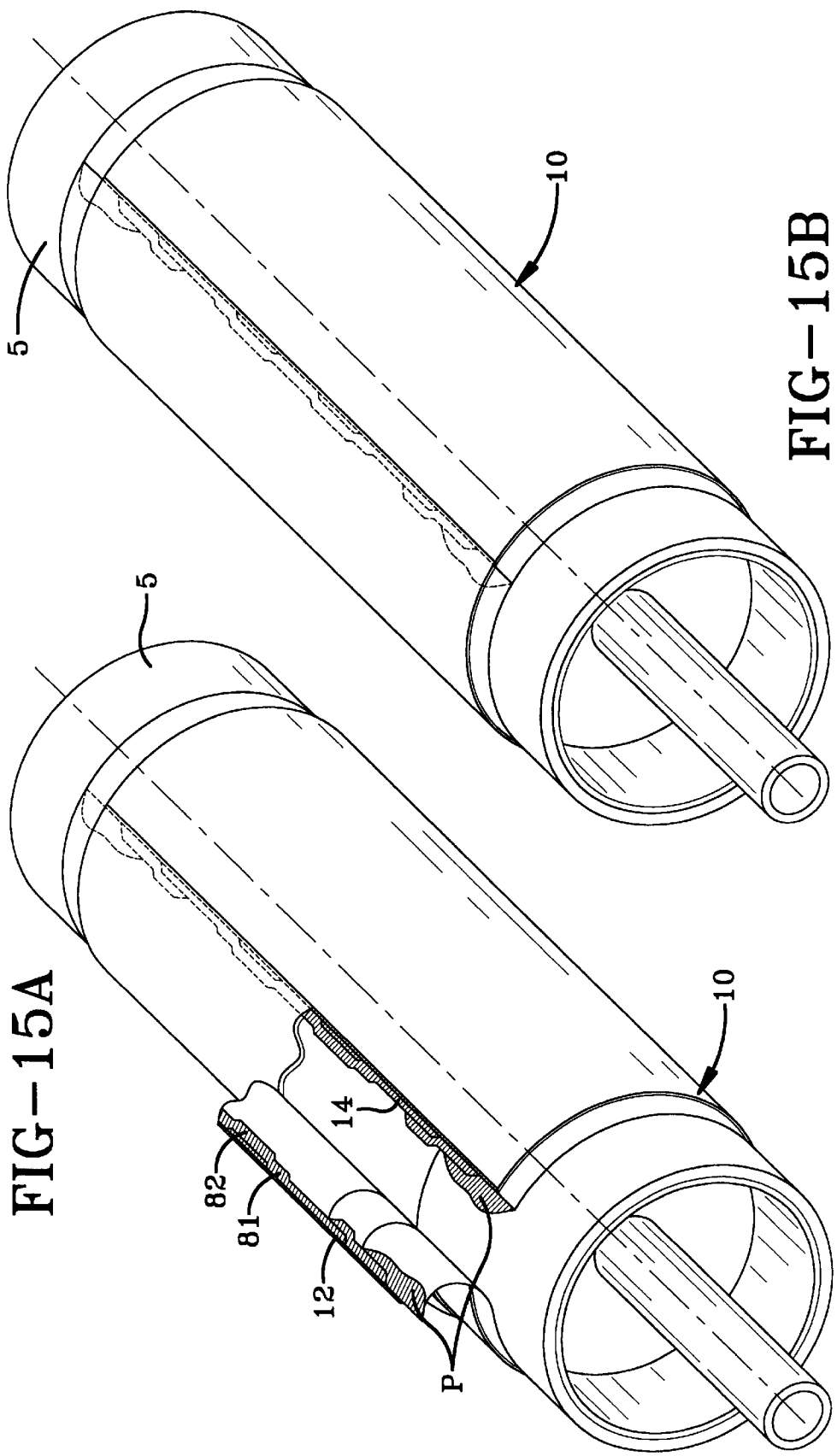

LAMINATE COMPOSITE STRUCTURE FOR MAKING AN UNVULCANIZED CARCASS FOR A RADIAL PLY TIRE AS AN INTERMEDIATE ARTICLE OF MANUFACTURE

This is a Continuation-in-Part of Parent application Ser. No. 08/688,239 filed Jul. 29, 1996 now abandoned, and 08/573,341 filed Dec. 15, 1995.

BACKGROUND OF THE INVENTION

This invention relates to a radial ply pneumatic tire and to a cylindrical carcass 10 for the pneumatic tire as an intermediate article of manufacture. The carcass 10 in its unvulcanized state is formed into a cylindrical shape at a tire building station and is a subassembly of a radial ply pneumatic tire. The invention is described in relation to a radial ply passenger tire, but it is applicable to light truck medium truck, agricultural, off-road and other radial ply tire constructions.

Historically, the pneumatic tire has been fabricated as a laminate structure of generally toroidal shape having beads, a tread, belt reinforcement and a carcass. The tire is made of rubber, fabric, and steel. The manufacturing technologies employed for the most part involve assembling the many tire components from flat strips or sheets of material. Each component is placed on a building drum and cut to length such that the ends of a component meet or overlap creating a splice.

In the first stage of assembly the carcass would include one or more plies, and a pair of sidewalls, a pair of apexes, an innerliner (for a tubeless tire), a pair of chafers and perhaps a pair of gum shoulder strips. Annular bead cores can be added during this first stage of tire building, and the ply or plies can be turned around the bead cores to form the "ply turnups."

The carcass components (excluding the bead cores) would be either "butt spliced" or "lap spliced." A butt splice has the component ends joined but not overlapped, a lap splice has overlapping ends.

This intermediate article of manufacture would be cylindrically formed at this point in the first stage of assembly. The cylindrical carcass is expanded into a toroidal shape after completion of the first-stage of tire building that results in such cylindrical intermediate article of manufacture. Reinforcing belts and the tread are added to the intermediate article during a second stage of tire manufacture, which can occur using the same building drum or workstation.

During the expansion of the carcass, tensile stresses are imposed on the spliced and uncured components of the tire carcass.

In the case of plies, lap splices were preferred because the splice remained intact whereas butt splices would tend to open or fail. Even with the good adhesion of the lap splice the cords adjacent the splice tended to be stretched compensating for the overlapped two layers of cords at the splice. This localized stretching creates a non-uniformity that is readily visible under x-ray or ultrasonic display.

The tire builder, in order to prevent the creation of tire uniformity problems has historically insured that the splices of the various layers of components were not circumferentially aligned. This non-alignment of splice joints was believed to improve the carcass overall durability, as measured by the ultimate burst strength of the tire. Tire engineers also have believed that tire uniformity could be improved if these discontinuities were deliberately circumferentially spaced around the carcass.

The subject matter of this patent application completely reverses this conventional wisdom as it relates to carcass construction. The carcass is manufactured with numerous components having a common splice line. The tire carcass built according to the present invention can actually increase the tire burst strength while reducing splice-related non-uniformities.

SUMMARY OF THE INVENTION

A laminate composite structure is provided in continuous lengths or rolls for making an unvulcanized carcass for a radial ply pneumatic tire as an intermediate article of manufacture. The laminate has a ply and a plurality of elastomeric components attached to the ply.

The ply has a width and is made of unvulcanized rubber reinforced with cords. The cords are oriented at an angle between 65° and 90° relative to the length of the laminate.

The plurality of elastomeric components each have a predetermined cross-sectional profile. Each component is formed and at the location where formed, is attached while hot to the ply. The elastomeric components include a liner, a pair of sidewalls and a pair of chafers. The liner has a pair of lateral ends defining the axial width of the liner, the axial width of the liner being narrower than the ply width. The pair of sidewalls, each have a non-linear contoured profile on one surface. Each sidewall is attached to the ply and extends axially outward of the ply. Each chafer is directly attached to and overlying a portion of the liner, the ply and one sidewall.

The laminate is adapted to be cut at a latter stage of building the tire to predetermined lengths having common ends, the common ends defining the length of the carcass. The common ends are adapted to be spliced along a substantially flat plane. The plane extends through the article across its axial width and is substantially parallel to the cords of the ply, thereby forming a cylindrical carcass adapted to accept a pair of annular bead cores positioned onto the cylindrical carcass.

The plurality of elastomeric components attached to the ply or other laminated components may further include one or more of the elastomeric components selected from the group of an apex, a whitewall strip, a cover strip, and a gum shoulder strip. Preferably the elastomeric components of the laminate, excluding the ply, have substantially tapered lateral edges extending along the laminates length.

A radial ply pneumatic tire 100 and a cylindrical or toroidal unvulcanized carcass 10 for the radial ply pneumatic tire, as an intermediate article of manufacture, is disclosed. The carcass 10 has a ply 20 and at least two components attached to the ply 20 or a liner 50, the components being selected from one or more of the component types consisting of an apex 30, a chafer 60, a liner 50, a sidewall 70, a whitewall strip 80, a cover strip 90 and a gum shoulder strip 40. The ply 20 has a width ($W_p$), a pair of ends 12,14, the distance between the ends defining the ply length (L). The ply 20 is made from unvulcanized rubber 24 reinforced with cords 22, the cords 22 being oriented at an angle between 65° and 90° relative to the ply length (L).

At least two of the components are laminated to one another and have common ends 12,14 spliced along a substantially flat plane (P), the plane (P) extending through the article across its axial width (W) substantially parallel to the cords 22 of the ply 20. The splice or flat plane (P) is inclined at an angle θ, θ being less than 90° and greater than 60° relative to a normal plane (NP) passing through the ply and extending parallel to the cords 22 or through the liner and perpendicular to either the ply 20 or liner 50. In a preferred embodiment of the invention the splice or flat plane (P) is inclined at an angle θ of about 80°. This orientation of the splice permits the ends 12,14 to have large surface areas which upon assembly greatly increases adhesion of the joint. Ideally for manufacturing efficiency and improved product quality it is preferable that the each of the components listed above in the quantities required to assemble the carcass be spliced along a straight linear surface as described above. If, however, the carcass is to include two or more cord-reinforced plies, with the cords in adjacent plies oppositely oriented at angles not precisely normal to length (L), then one of the plies at least may have to be laminated to the carcass in a separate operation.

BRIEF DESCRIPTION OF THE DRAWINGS

FIG. 3 is an enlarged transverse view of the carcass end 12 taken along lines 3—3 of FIG. 2A.

FIG. 4 is an enlarged transverse view of the opposite carcass end 14 taken along line 4—4 of FIG. 2A.

FIG. 5 is a partial view of the carcass depicting the splice joint of the carcass prior to its being toroidally expanded.

FIG. 6 is a partial view of the carcass, depicting the splice, after the carcass has been cylindrically formed on a toroidal drum 5.

FIGS. 7A and 7B are perspective views of the carcass cylindrically formed on a building drum.

FIG. 7C is a cross-sectional view of the carcass after being expanded and toroidally formed.

FIG. 8A is an illustration of the apparatus used to form and assemble the carcass absent the apex.

FIG. 8B is an illustration of the apparatus employed to form and assemble the carcass with apex.

FIG. 11 is an enlarged transverse view of the subassembly end 14 taken along lines 3—3 of FIG. 10A.

FIG. 12 is an enlarged transverse view of the opposite subassembly end 12 taken along line 4—4 of FIG. 10A.

FIGS. 15A and 15B are perspective views of the complete carcass cylindrically formed on a building drum.

DEFINITIONS

Figure 1:
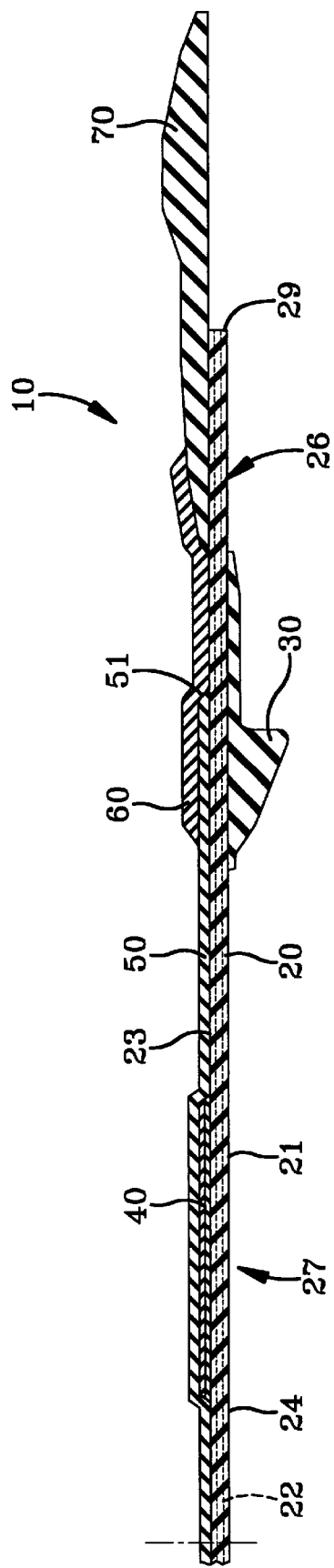
FIG. 1 illustrates one half of the carcass subassembly cross section as taken along lines 1—1 of FIG. 2A prior to being formed cylindrically upon a tire building drum, the building drum not illustrated.

"Apex" means an elastomeric filler located radially above the bead and interposed between the plies and the ply turnup.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt Structure" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Chafers" refers to narrow strips of material placed around the outside of the bead to protect cord plies from the rim, distribute flexing above the rim, and to seal the tire.

"Cord" means one of the reinforcement filaments, cables or strands of which the plies in the tire are comprised.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Ply" means a continuous layer of rubber-coated parallel cords.

"Radial" and "radially" mean directions radially toward or away from the axis of rotation of the tire.

"Radial ply tire" means a belted or circumferentially-restricted pneumatic tire in which the ply cords which extend from bead to bead are laid at cord angles between 65° and 90° with respect to the equatorial plane of the tire.

"Section height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Shoulder gum strip" means an elastomeric reinforcement located in the shoulder region of the carcass.

"Sidewall" means that elastomeric portion of a tire between the tread and the bead.

"Subassembly" means an unvulcanized assembly of laminated unreinforced tire components to which a cord reinforced ply or plies and other tire components can be added to form a casing.

"Tread" means a rubber component which when bonded to a tire carcass includes that portion of the tire that come into contact with the road when the tire is normally inflated and under normal load.

"Tread width" means the arc length of the tread surface in the axial direction, that is, in a plane parallel to the axis of rotation of the tire.

DETAILED DESCRIPTION OF THE PREFERRED EMBODIMENT

Referring to FIGS. 1, 2 and 3 there is illustrated an intermediate article of manufacture made in accordance with the present invention. The intermediate article of manufacture is a carcass 10 for a pneumatic tire 100.

FIG. 1 illustrates the intermediate article of manufacture 10, the article being a tire carcass 10. The figure shows the carcass 10 as a flat laminate composite structure having first and second longitudinal ends and comprising many components. As shown all of the components are either sheets or strips of material of substantially the same length. Each component shown is precisely located laterally relative to one another. The method and apparatus 200 for producing and cutting this laminated structure is disclosed in concurrently filed and co-pending U.S. patent applications Ser. Nos. 08/369,211 and 08/369,192 respectively, entitled "METHOD AND APPARATUS FOR CUTTING A CORD REINFORCED ELASTOMERIC LAMINATE" AND "A METHOD AND APPARATUS FOR BUILDING A LAMINATE AND FORMING A CARCASS FOR TIRE FROM AN ASSEMBLY OF TIRE COMPONENTS" (attorney docket numbers 94304A and 94304B), which are incorporated herein by reference.

The carcass material 10A when manufactured by the apparatus 200 as shown in FIGS. 8A or 8B can be made into continuous rolls 210. The carcass material 10A prior to cutting is then, in its preassembled state, preferably stored in large rolls 210 which when sent to a tire building station are cut to a precise length (L) by a unique cutting apparatus. The cut to length carcass 10 is then formed into a cylindrical shape as described later in this patent application.

FIG. 1 depicts illustrated embodiments of the invention wherein the carcass 10 has a ply 20, the ply being reinforced with parallel cords 22 which are encapsulated in unvulcanized rubber 24 and which are oriented at an angle of 65° to 90° relative to the length (L); preferably, an angle of 90° is used for the cords of a tire having only one ply extending from bead-to-bead. The ply 20 has a width ($W_p$) and length is (L). The ply 20 has a pair of turn-up portions 26 located at the lateral extremes of the ply 20. Attached to an outer surface 21 of the ply 20 is a pair of apexes 30. The apexes 30 are located on the ply in the turnup region 26 and are positioned to wrap about and primarily above a bead at a later assembly station. The bead tensile member preferably employed is of the cable bead type.

Axially inward of the apexes and attached to an inner surface 23 of the ply 20 is a pair of shoulder gum strips 40. The shoulder gum strip acts as a rubber reinforcement in the shoulder portion 27 of the carcass 10.

A liner component 50 is attached to the ply and over the shoulder gum strips 40. The liner 50 creates an air impervious barrier for the radially inner air chamber of the tubeless type tire. The liners are generally comprised of halobutyl rubber. The liner 50 has an axial width narrower than the ply 20. The liner width is sufficient to traverse axially outward of the beads when the tire is toroidally shaped, thus forming an air tight chamber between the tire 100 and the wheel upon assembly.

A chafer component 60 is shown at each lateral end 51,52 of the liner 50. The chafer 60 is attached to the liner 50, to the inner surface 23 of the ply 20 and slightly overlaps a sidewall component 70. The chafer 60 is positioned axially to provide a tough rubber reinforcement between the tire 100 and the rim flange of the wheel and is accordingly located in the bead region of the finished tire.

A sidewall component 70 is shown attached to the ply and extends laterally outward of the lateral ends 29 of the ply 20. The sidewalls 70 are slightly overlapped by the chafers 60.

Optionally, to build an outlined white letter tire or a whitewall tire, a whitewall strip 80 and a cover strip 90 may be added to the carcass material 10A as shown in FIG. 8A and FIG. 8B.

It is believed preferable in cases where a non-cable bead is used in the tire construction that the apex be added at a latter stage as shown in the apparatus 200 of FIG. 8A. This enables the carcass material 10A to be wound into large rolls 210 without any distortion of the high profile extruded apex components. Alternatively, in cases where an apex and cable bead are employed it is believed preferable to couple the carcass assembly apparatus 200 of FIG. 8B to one or more tire building machines without requiring the carcass material 10A to be rolled onto a spool. This enables the apex of the carcass 10 to be manufactured free of any potential distortions caused by handling and storage.

The above description of the carcass 10 includes all of the elastomeric components required to build the tubeless tire carcass 10 and it is considered to be the best mode of practicing the invention because it is a most efficient method to produce such a tire carcass 10. As previously mentioned, should the tire engineer choose, the apexes 30 could be added at a later stage of building to facilitate the use of different bead constructions such as hexagonal or strap type beads.

Additionally, it is considered within the scope of the invention that the intermediate article of manufacture include one ply 20 or one liner 50 and at least two of the components selected from the group of components described above, all having the unique common splice feature as described below.

Figure 2A:
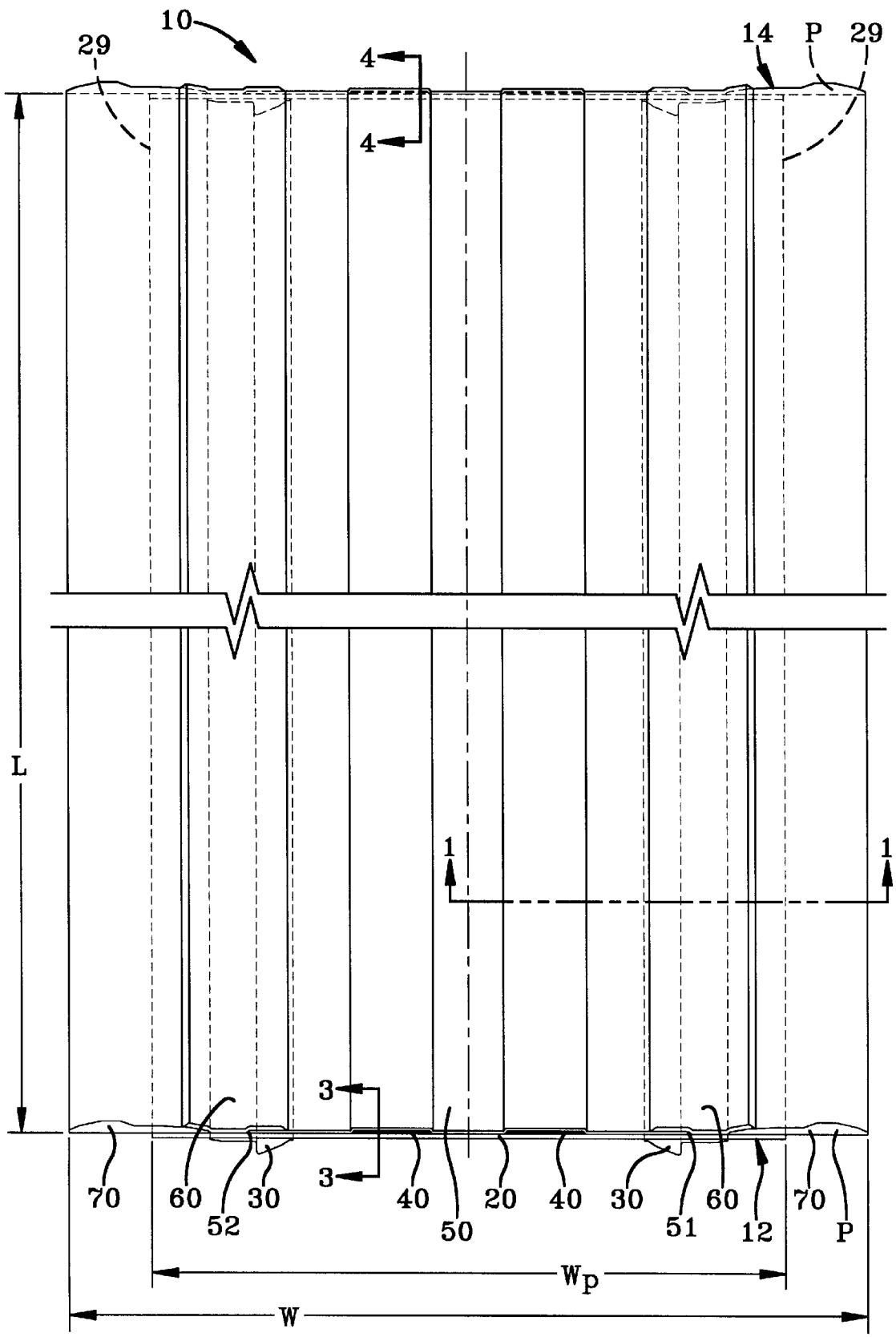
FIG. 2A is a partial plan view of the carcass's inner surface with components attached.
Figure 2B:
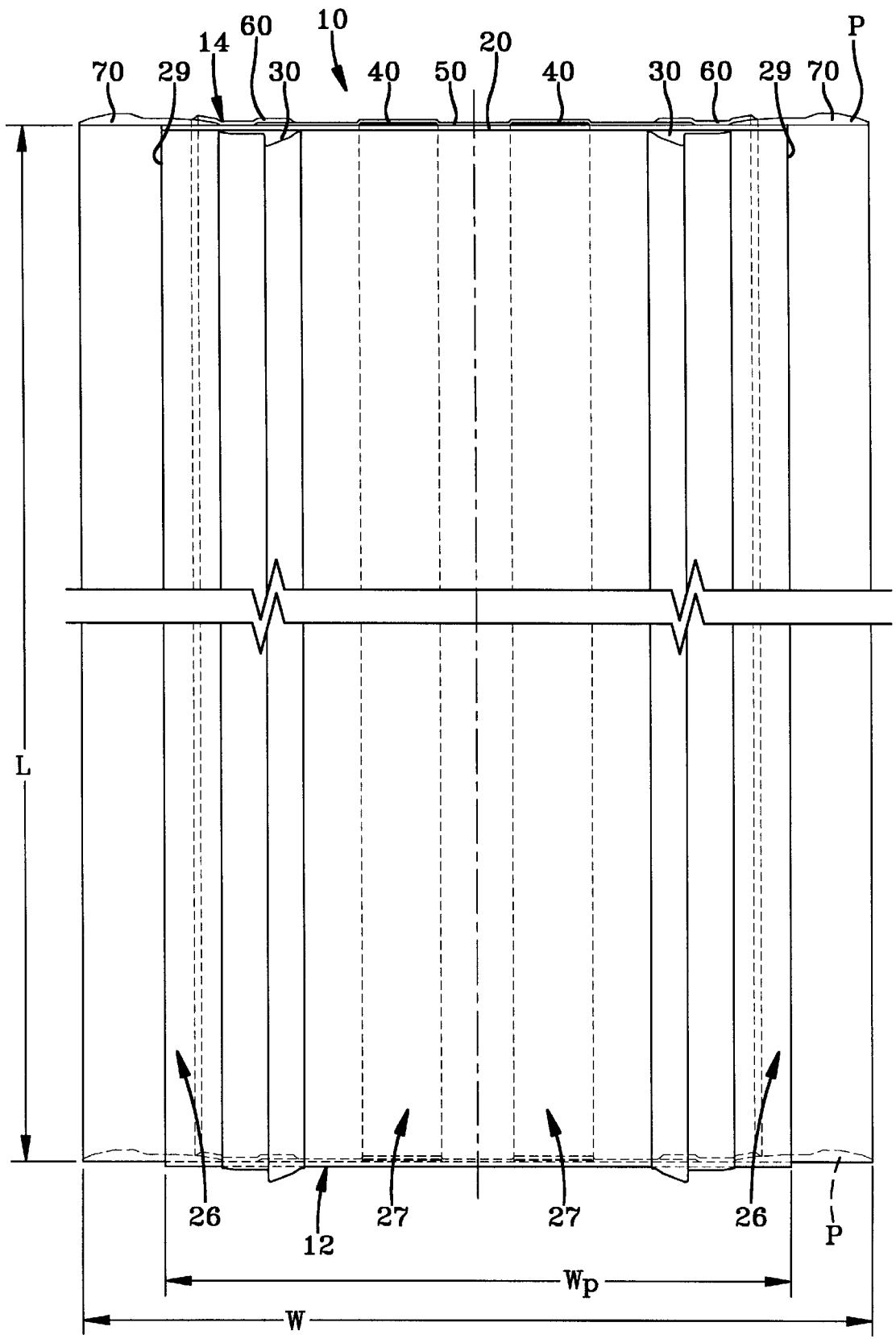
FIG. 2B is a partial plan view of the carcass's outer surface with components attached, both views FIG. 2A and FIG. 2B being slightly inclined to depict the ends 12 and 14.

FIGS. 2A and 2B depict the first end 12 and second end 14 respectively of the carcass 10 as it exists prior to being formed into a cylindrical shape and spliced at its joined ends 12,14. Both ends 12,14 are cut along an axially or laterally extending substantially straight line path substantially parallel to the cords 22 of the ply 24. The cut surfaces or ends 12,14 deviate slightly at the cords 22 from the substantially flat plane P. This minor deviation occurs when the cutting element bends slightly to pass through the cords without damaging them. The substantially straight line cutting creates a first end or surface area 12 and a second end or surface area 14. The surface areas 12 and 14 (as may best be seen in FIGS. 3–6) are inclined at an angle è less than 90° relative to a normal plane (NP), the normal plane NP) being perpendicular to the ply 20 and substantially parallel to the cords 22 in the ply 20.

In order to achieve sufficiently large surface areas 12,14 for splicing, it is believed desirable to insure that the angle è be greater than 60°. In the preferred embodiment the angle è is about 80°. Some tires have been built having a carcass cut at an angle θ of 82°. This high angle of inclination provides a large surface area of adhesion when the two ends 12,14 are spliced at the building drum as shown in FIG. 5. As shown in FIG. 7A the cut ends 14,16 exhibit fine ribs or ridges 81 and valleys or grooves 82 which are formed when the laminate 10 is cut. These smeared surfaces are believed to further enhance the adhesion of the splice. Each ridge 81 or valley 82 has a respective height or depth less than the diameter (d) of the wire used to cut the subassembly preferably about one half (d). The spacing of each ridge and valley closely approximate the wire diameter (d) but can vary based on the cutting traversing speed. These fine undulating surfaces are believed to further enhance the adhesion of the splice.

The cut ends 12,14 were formed by the reciprocating motion of a wire having a diameter (d) sufficiently small to cut the thinnest cross section of the subassembly 10 without buckling the ends of the subassembly 10, preferably the wire has a diameter of less than 0.050 of an inch. In the preferred embodiment the wire diameter was 0.016 of an inch. The wire cuts at a high cyclic rate but substantially slower rates than ultrasonic type cutters. This cutting is done with a cold or room temperature wire. The only heat generated is the frictional heat created during cutting. This cold cutting unlike any hot knife cutting, laser or ultrasonic cutting does not surface precure the material along the flat planar surfaces P. This in combination with the ridges 81 and valleys 82 creates a bonding surface heretofore unachievable particularly at the angular inclination è, most certainly when è is set at about 80°. In such cases the alternative cutting techniques tend to push and bunch the material unable to create a flat planar surface cut as described above. For these reasons the subassembly 10 can be any two components laminated together having the common cut ends as disclosed above.

The carcass assembly 10 is shown in FIG. 7A wrapped about a building drum 5 and a portion of the carcass is shown prior to being spliced. The carcass ends 12 and 14 have two inclined substantially flat surfaces lying in planes P. The ends 12 and 14 are spliced together along the plane P as shown in FIG. 7B.

With reference to FIGS. 5 and 6 the carcass after being cut to length and wrapped about a cylindrical building drum is spliced. Although the first and second ends have almost identical mating surfaces, it has been empirically discovered that the carcass splice should slightly overlap as shown in the enlarged view of FIG. 6. The preferred overlap is such that at least one cord 22 is radially aligned and preferably two cords are aligned. This feature coupled with the inclined surfaces 12,14 enables the carcass 10 when expanded to stretch precisely at the splice. The resultant effect is that the overlapping cords 22 are pulled back into uniform alignment with the remaining cords 22 in the ply 20. After vulcanization, tires made according to the invention have to be x-rayed, ultrasonically inspected or buffed down to the ply cords in an attempt to visually detect the ply splice. The splice is virtually not detectable to experienced personnel. The cords 22 are uniformly spaced and for all intents and purposes the carcass appears to be spliceless.

In FIG. 7C the carcass is shown in a cross-sectional view after being expanded into a toroidal shape. Prior to expanding the carcass, the annular beads 120 are positioned onto the cylindrical carcass, and the turnup ends and sidewalls are rolled over the bead cores and are stitched to the ply 20. The carcass is then expanded into the toroidal shape as illustrated.

Figure 7D:
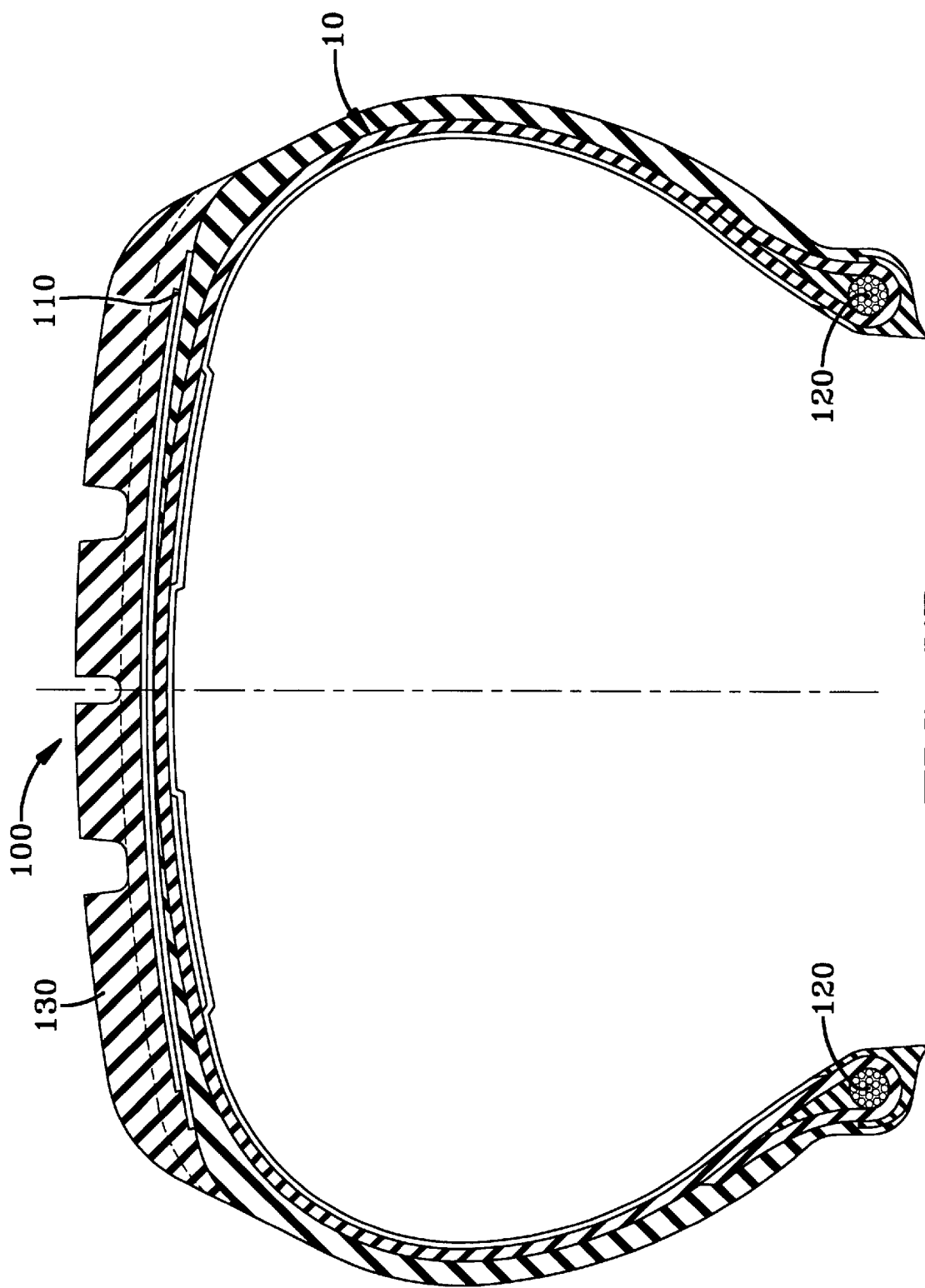
FIG. 7D is a cross-sectional view of a tire made with the carcass.
Figure 9:
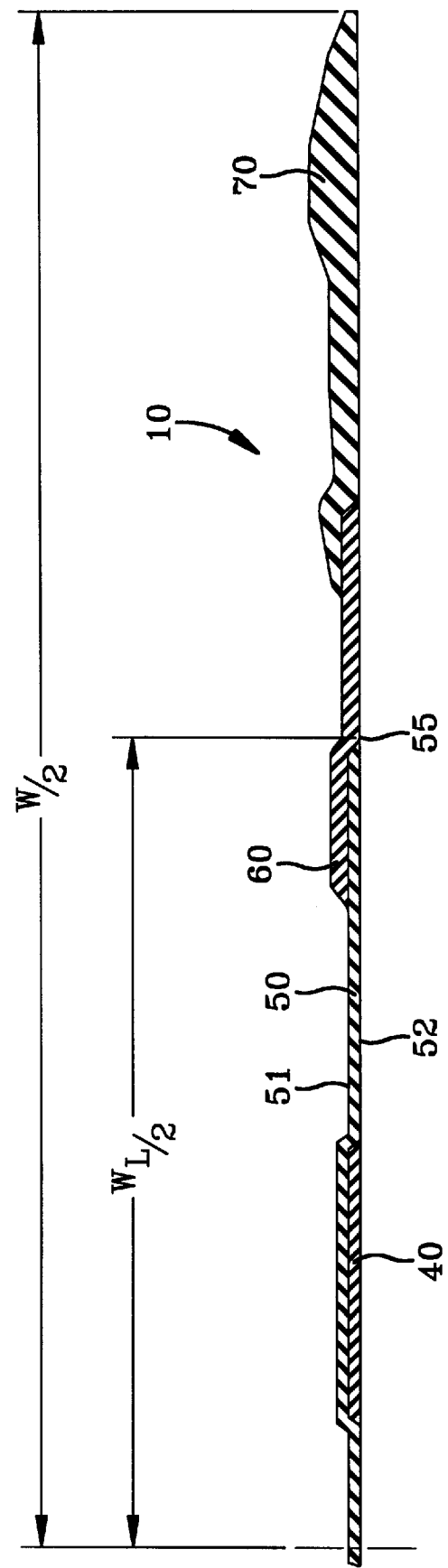
FIG. 9 illustrates one half of the subassembly cross section as taken along lines 1—1 of FIG. 10A prior to being formed cylindrically upon a tire building drum, the building drum not illustrated.
Figure 10A:
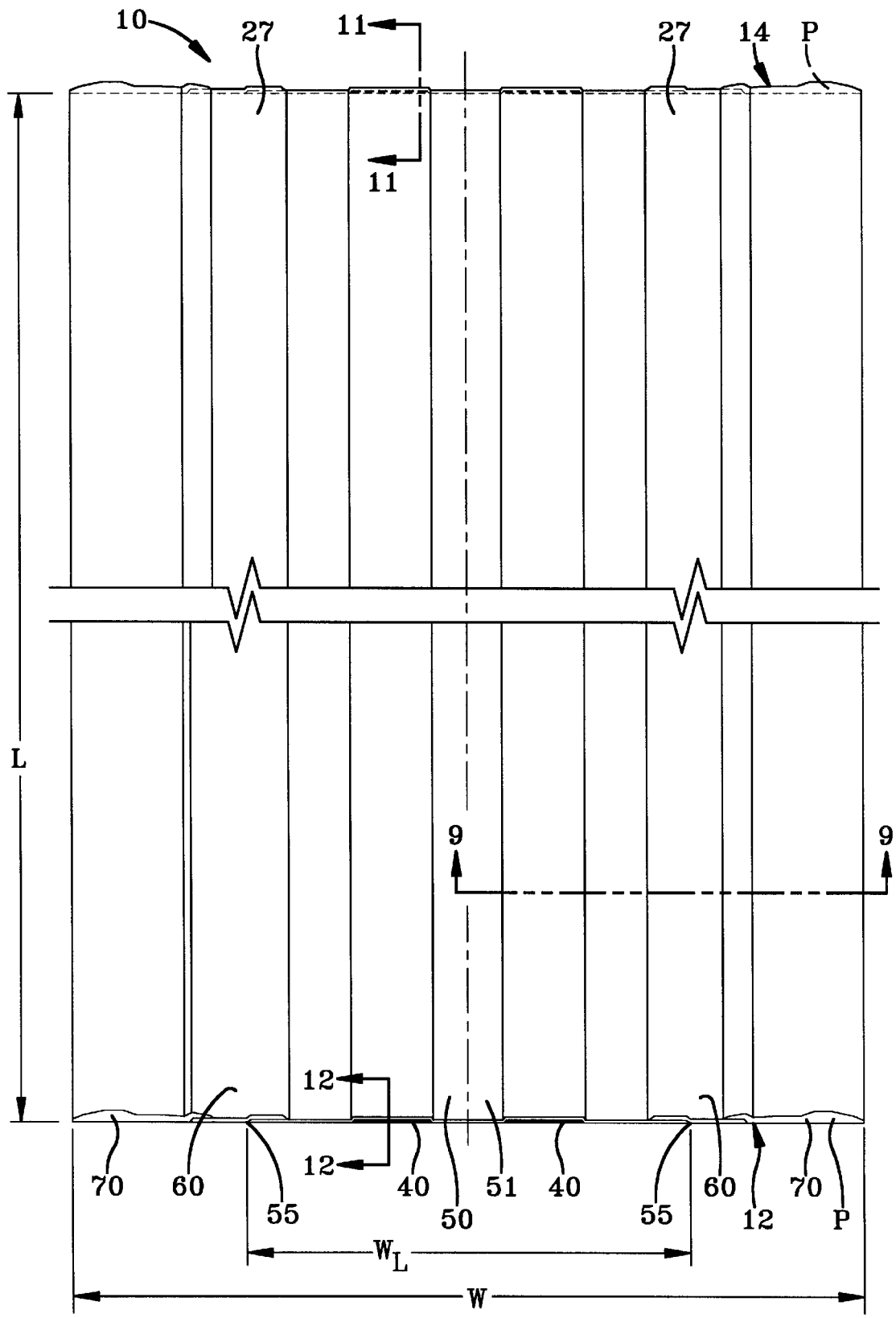
FIG. 10A is a partial plan view of the unreinforced subassembly's inner surface with components attached.
Figure 10B:
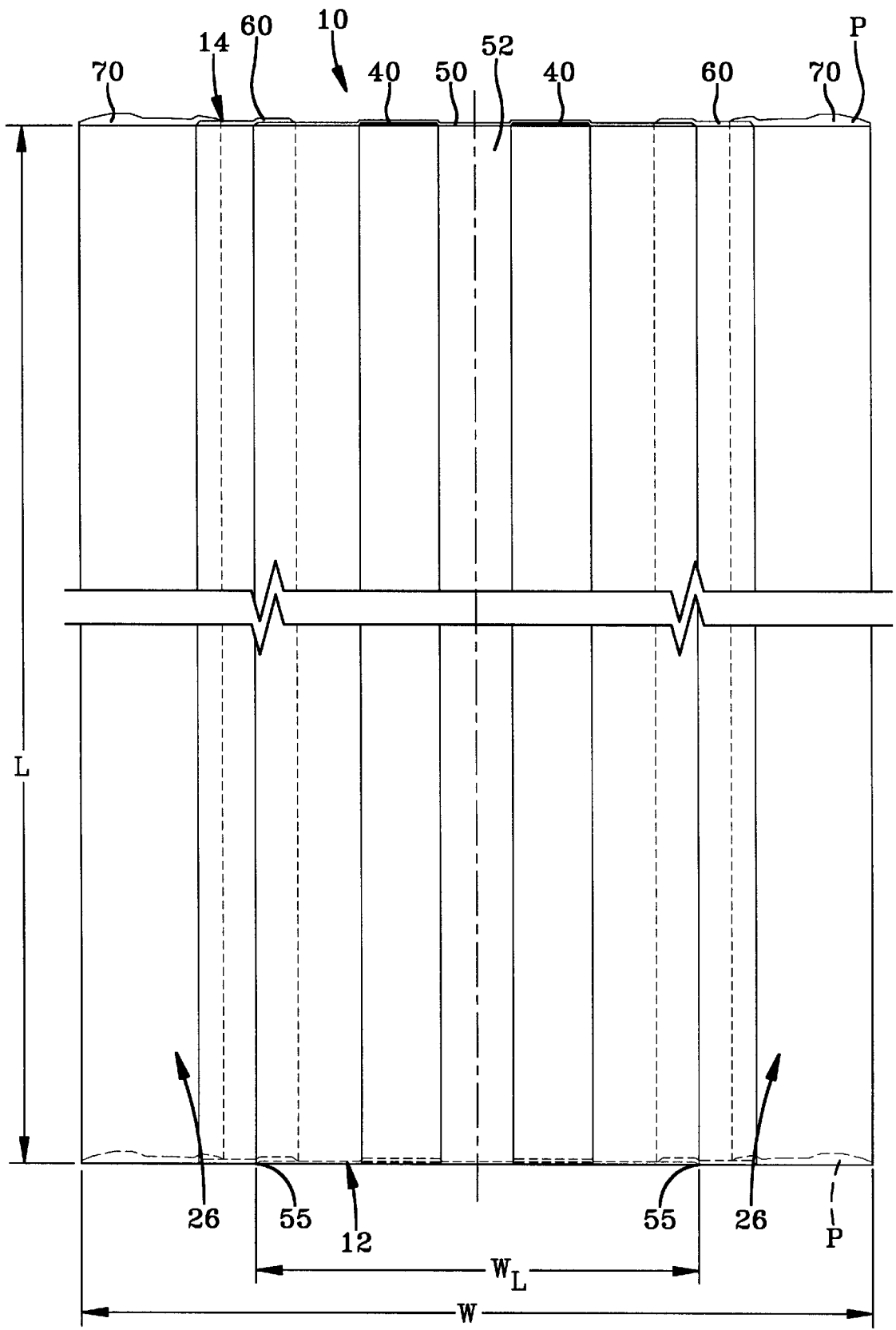
FIG. 10B is a partial plan view of the unreinforced subassembly's outer surface with components attached, both views FIG. 10A and FIG. 10B being slightly inclined to depict the ends 12 and 14.
Figure 13:
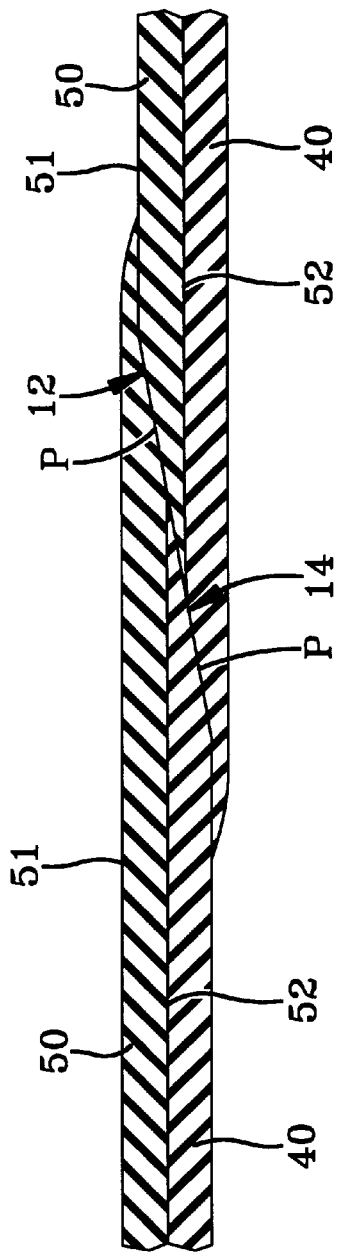
FIG. 13 is a partial view of the carcass depicting the splice joint of the subassembly prior to its being toroidally expanded.
Figure 14:
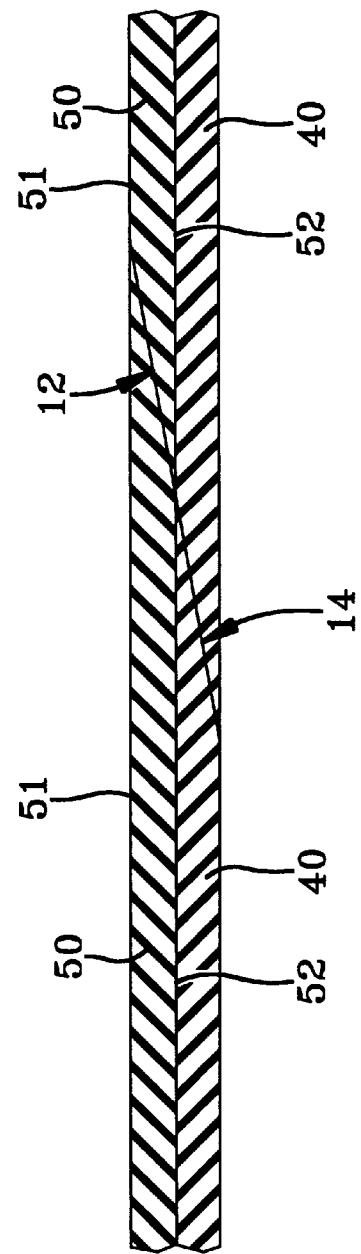
FIG. 14 is a partial view of the subassembly depicting the subassembly splice, after it has been cylindrically formed on a toroidal drum 5.
Figure 15C:
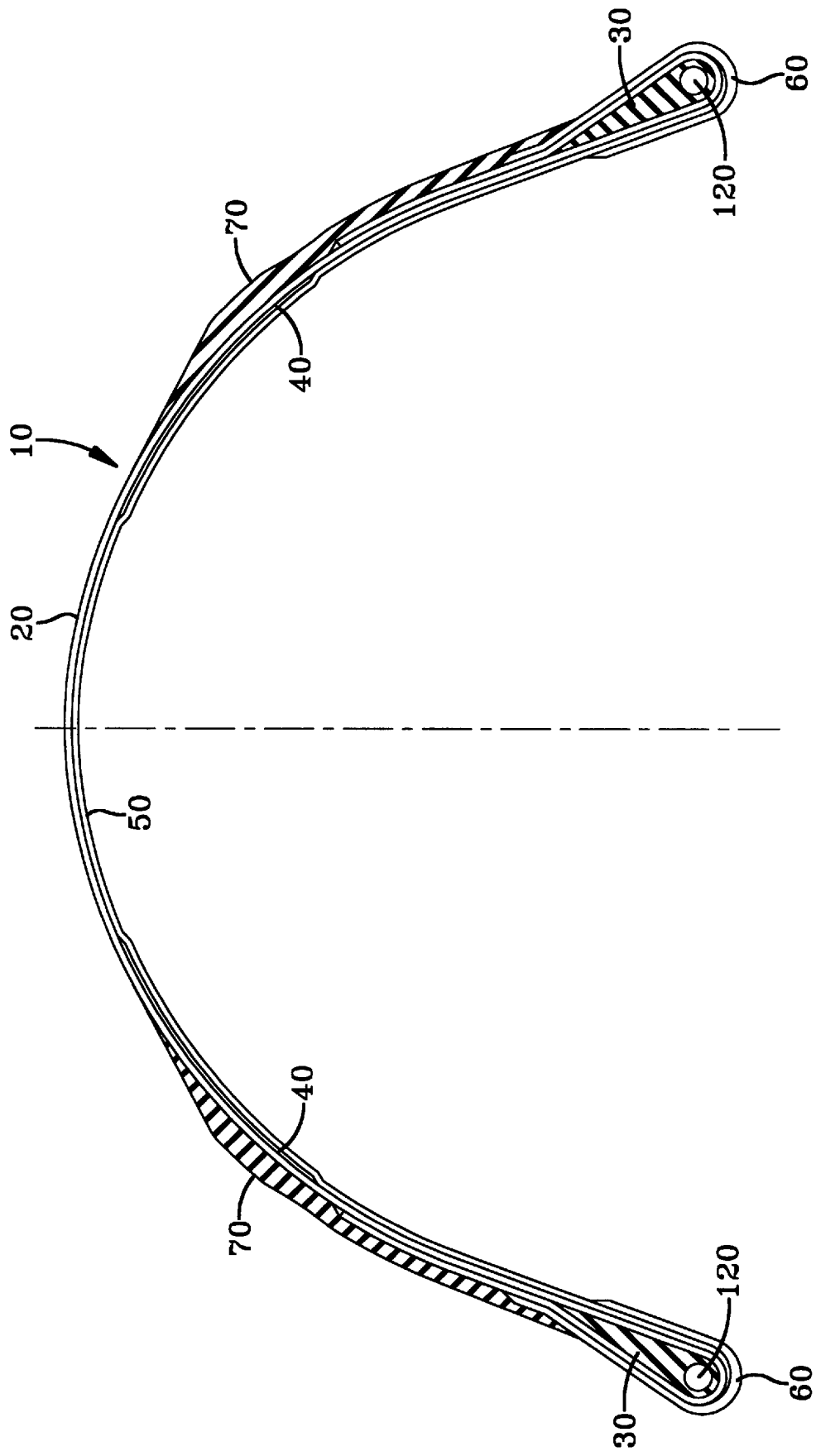
FIG. 15C is a cross-sectional view of the complete carcass after being expanded and toroidally formed.
Figure 15D:
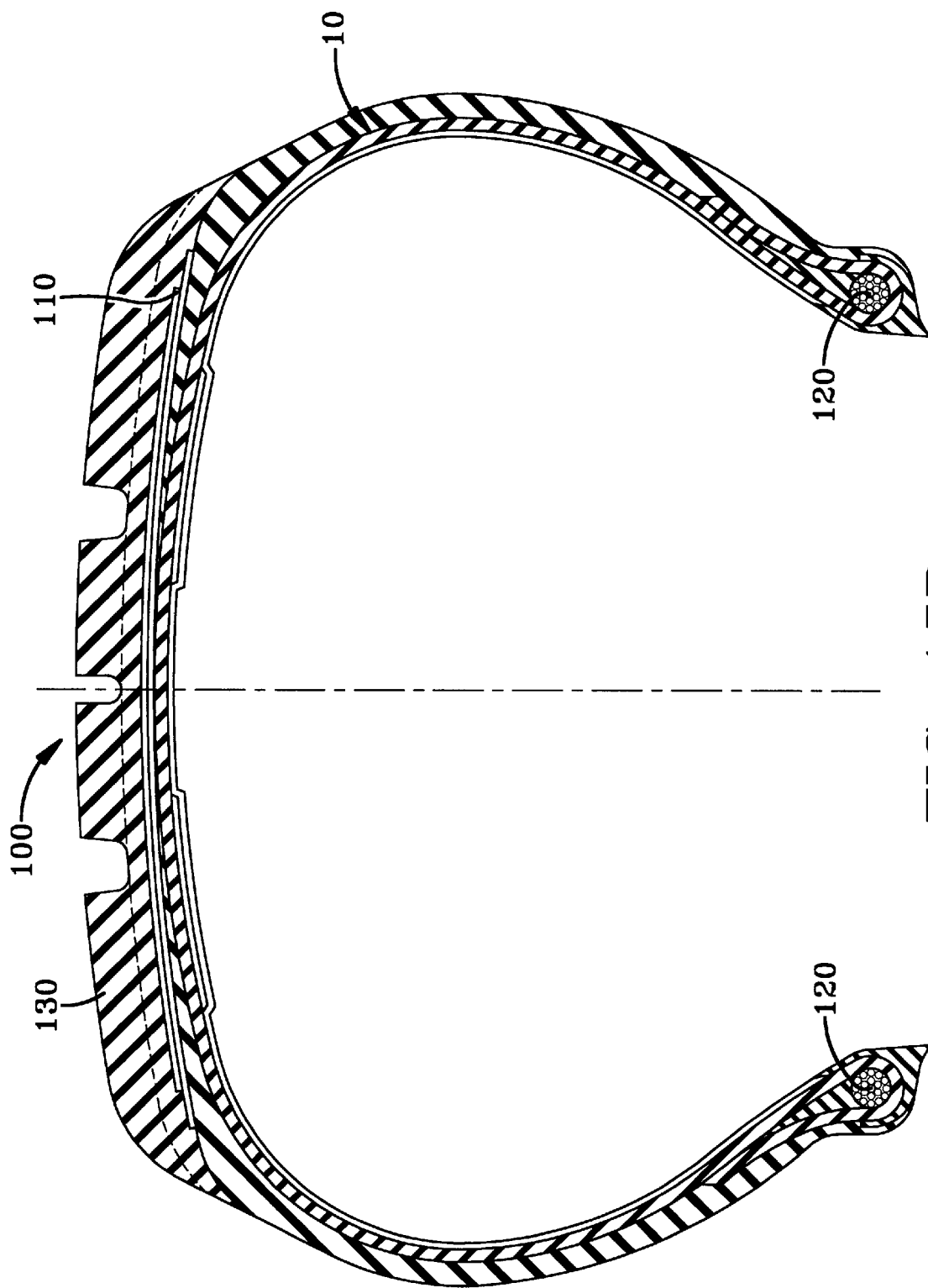
FIG. 15D is a cross-sectional view of a tire made with the subassembly.
Figure 16:
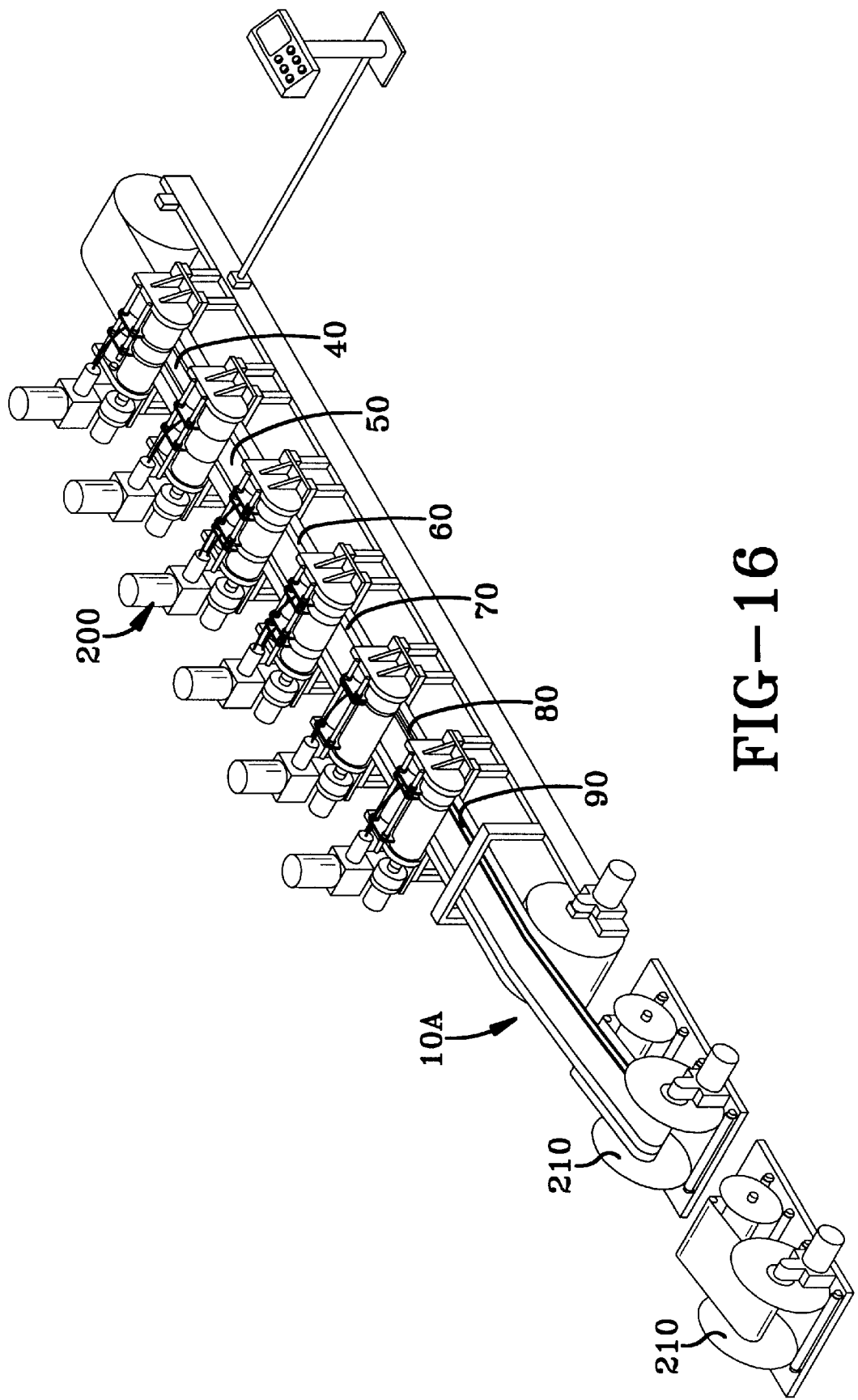
FIG. 16 is an illustration of the apparatus used to form and assemble the subassembly.

In FIG. 7D a finished tire is shown in cross section. The finished tire 100 when assembled and cured will have the carcass 10, reinforcing belts 110, annular beads 120 and a tread 130. The carcass 10 will have the common end splice. Occasionally, due to the fact that the ply fabric itself has a finite length, the carcass may also exhibit one additional ply lap splice. It is believed desirable when building the finished tire to insure that the carcass 10, the additional plies if required, the reinforcing belts 110 and tread 130 have their splices circumferentially spaced as is the conventional practice.

The invention described above not only enables tires to be more efficiently manufactured but also enables the tires to exhibit far greater uniformity and durability.

Tires 100 built according to the invention were tested for burst strength when compared to the same construction tire conventionally assembled. The experimental tires average burst strength actually increased when compared to conventionally built tires. All else being equal it is believed that the carcass 10 according to the invention is in fact stronger.

Uniformity tests indicate that the tires 100 made according to the present invention improved both in ride and vibration related performance.

The radial ply pneumatic tire 100 according to the present invention has a toroidal shape, the tire 100 has a tread 130, at least two belt plies 110 having cord angles oppositely oriented with respect to the equatorial plane of the tire 100. The belt plies are oriented at angles in the range from 17° to 30°. The tire 100 has a carcass 10 having at least one ply with radially-oriented cords and other carcass components, the ply at least two, preferably all such carcass components having been spliced along a single surface or plane curing construction of the carcass 10 as an intermediate article of manufacture. It is believed preferable that the additional plies, belts and tread have their respective spliced ends joined circumferentially spaced from the carcass 10 splice.

In building radial ply tires it has been determined that the cord angles of adjacent plies in multiple ply tire constructions preferably should be oppositely oriented relative to the equatorial plane. For that reason it is believed desirable to assemble additional plies to the tire carcass in a separate step at the tire building station, when a second or more plies are needed to manufacture the tire. In many tires particularly steel cord reinforced tires, only one ply 20 is required in the manufacture of the finished tire 100. In those cases, the carcass 10 can be reinforced with the bead cores 120, belts 110 and tread 130 for a complete tire 100.

In FIGS. 9, 10A, 10B, 11, 12, 13, 14, 15, 15A, 15B, 15C, 15D and 16 the same apparatus used to form the laminated carcass with a ply is used to form a subassembly without a cord reinforced ply. In those figures the liner 50 preferably replaces the ply 20, the ply 20 being added to the subassembly to a latter stage in the tire building procedure. For the purposes of understanding the invention shown in FIGS. 9 through 16, the reader simply should recall the description of the FIGS. 1–8 and apply those concepts to the noncord reinforced article of manufacture of laminated tire components.

What is claimed is:

1. A laminate composite structure provided in continuous lengths or rolls for making an unvulcanized carcass for a radial ply pneumatic tire as an intermediate article of manufacture, the laminate comprising:

a ply, the ply having a width, the ply having unvulcanized rubber reinforced with cords, the cords being oriented at an angle between 65° and 90° relative to the length of the laminate;

a plurality of elastomeric components each component having a predetermined cross-sectional profile, each component being formed and at the location where formed, being attached while hot to the ply, the elastomeric components including a liner, the liner having a pair of lateral ends defining the axial width of the liner, the axial width of the liner being narrower than the ply width, a pair of sidewalls, each sidewall having a non-linear contoured profile on one surface, each sidewall being attached to the ply and extending axially outward of the ply, a pair of chafers, one chafer being directly attached to and overlying a portion of the liner, the ply and one sidewall; and the laminate is adapted to be cut at a latter stage of building the tire to predetermined lengths having common ends, the common ends defining the length of the carcass, the common ends are adapted to be spliced along a substantially flat plane, the plane extending through the article across its axial width and is substantially parallel to the cords of the ply, thereby forming a cylindrical carcass adapted to accept a pair of annular bead cores positioned onto the cylindrical carcass.

2. The laminate composite structure of claim 1, being cut to the predetermined length wherein the common ends are uncured being cut and lying along a flat planar surface P, the material along the flat planar surface P not surface precured, the common ends being spliced along a substantially flat plane, the flat plane is inclined at an angle $\theta$, $\theta$ being less than 90° and greater than 60° relative to a plane passing through the ply and extending parallel to the cords and perpendicular to the ply.

3. The laminate composite structure of claim 2 wherein $\theta$ is about 80°.

4. The laminate composite structure of claim 1, wherein the plurality of elastomeric components attached to the ply or other laminated components further include one or more of the elastomeric components selected from the group of an apex, a whitewall strip, a cover strip, and a gum shoulder strip.

5. The laminate composite structure of claim 1 where the plurality elastomeric components have substantially tapered lateral edges extending along the length of the laminate.

* * * * *